US011879681B2

(12) United States Patent
Ahn et al.

(10) Patent No.: US 11,879,681 B2
(45) Date of Patent: Jan. 23, 2024

(54) METHOD FOR CONTROLLING REFRIGERATOR

(71) Applicant: LG ELECTRONICS INC., Seoul (KR)

(72) Inventors: Seunguk Ahn, Seoul (KR); Kyunghun Cha, Seoul (KR); Sunam Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/265,068

(22) PCT Filed: Aug. 1, 2019

(86) PCT No.: PCT/KR2019/009597
§ 371 (c)(1),
(2) Date: Feb. 1, 2021

(87) PCT Pub. No.: WO2020/027595
PCT Pub. Date: Feb. 6, 2020

(65) Prior Publication Data
US 2021/0310719 A1    Oct. 7, 2021

(30) Foreign Application Priority Data

Aug. 2, 2018 (KR) .................. 10-2018-0090441

(51) Int. Cl.
*F25D 11/02* (2006.01)
*F25B 5/02* (2006.01)
(Continued)

(52) U.S. Cl.
CPC .............. *F25D 11/022* (2013.01); *F25B 5/02* (2013.01); *F25B 49/02* (2013.01); *F25D 29/00* (2013.01);
(Continued)

(58) Field of Classification Search
CPC .. F25D 11/022; F25D 17/065; F25D 2700/12; F25D 2700/121; F25D 2700/122;
(Continued)

(56) References Cited

U.S. PATENT DOCUMENTS

2007/0227166 A1   10/2007   Rafalovich et al.
2010/0095691 A1    4/2010   Kondou et al.
(Continued)

FOREIGN PATENT DOCUMENTS

CN    1233738    11/1999
CN    1828179     9/2006
(Continued)

OTHER PUBLICATIONS

European Search Report issued in Application No. 19845173.4 dated Apr. 25, 2022.
(Continued)

*Primary Examiner* — Henry T Crenshaw
(74) *Attorney, Agent, or Firm* — KED & ASSOCIATES, LLP (57) ABSTRACT

A refrigerator control method of the present embodiment comprises the steps of: operating a compressor by operating a first cooling cycle for cooling a first storage chamber, and operating a first cold air supply means for the first storage chamber; and operating the compressor by switching into a second cooling cycle for cooling a second storage chamber, and operating a second cold air supply means, when a stop condition of the first cooling cycle is satisfied, wherein the cooling capacity of the compressor in the current second cooling cycle is determined on the basis of the representative temperature of the second storage chamber during one operating cycle which includes the previous first cooling cycle and the previous second cooling cycle, and a control unit performs control such that the compressor is operated in
(Continued)

the current second cooling cycle with the determined cooling capacity.

5 Claims, 6 Drawing Sheets

(51) Int. Cl.
    *F25B 49/02*     (2006.01)
    *F25D 29/00*     (2006.01)

(52) U.S. Cl.
    CPC ....... *F25B 2400/19* (2013.01); *F25B 2600/01* (2013.01); *F25B 2600/2511* (2013.01); *F25B 2700/2104* (2013.01); *F25D 2700/121* (2013.01)

(58) Field of Classification Search
    CPC . F25D 29/00; Y02B 30/70; F25B 5/02; F25B 49/02; F25B 2600/01
    See application file for complete search history.

(56) References Cited

U.S. PATENT DOCUMENTS

| | | | |
|---|---|---|---|
| 2012/0023980 A1 | 2/2012 | Lee et al. | |
| 2013/0305755 A1* | 11/2013 | Gomes | F25B 49/02 62/126 |
| 2017/0082337 A1* | 3/2017 | Kim | F25B 49/025 |

FOREIGN PATENT DOCUMENTS

| | | |
|---|---|---|
| CN | 202709632 | 1/2013 |
| DE | 10 2014 217 671 | 3/2016 |
| EP | 1 245 914 | 10/2002 |
| EP | 2 019 275 | 1/2009 |
| EP | 2 136 167 | 12/2009 |
| EP | 2 667 124 | 11/2013 |
| JP | 2007-093052 | 4/2007 |
| KR | 10-2000-0010258 | 2/2000 |
| KR | 10-0716300 | 5/2007 |
| KR | 10-2009-0131141 | 12/2009 |
| KR | 10-1576686 | 12/2015 |
| KR | 10-2016-0109037 | 9/2016 |
| KR | 10-1705528 | 2/2017 |
| KR | 10-2017-0027630 | 3/2017 |
| KR | 10-2017-0029346 | 3/2017 |
| KR | 10-2018-0061762 | 6/2018 |
| KR | 10-2018-0065192 | 6/2018 |
| WO | WO 03/025480 | 3/2003 |
| WO | WO 2008/082084 | 7/2008 |
| WO | WO 2017/164712 | 9/2017 |
| WO | WO 2018/038023 | 3/2018 |

OTHER PUBLICATIONS

Chinese Office Action issued in Application No. 201980051588.4 dated May 5, 2022.
Chinese Office Action issued in Application No. 201980051588.4 dated Nov. 29, 2022.
Korean Notice of Allowance dated Jan. 3, 2023.
International Search Report (with English Translation) dated Nov. 6, 2019 issued in Application No. PCT/KR2019/009597.
Written Opinion dated Nov. 6, 2019 issued in Application No. PCT/KR2019/009597.
European Search Report issued in Application No. 19845173.4 dated Sep. 6, 2022.

* cited by examiner

METHOD FOR CONTROLLING REFRIGERATOR

CROSS-REFERENCE TO RELATED PATENT APPLICATIONS

This application is a U.S. National Stage Application under 35 U.S.C. § 371 of PCT Application No. PCT/KR2019/009597, filed Aug. 1, 2019, which claims priority to Korean Patent Application No. 10-2018-0090441, filed Aug. 2, 2018, whose entire disclosures are hereby incorporated by reference.

TECHNICAL FIELD

The present disclosure relates to a method for controlling a refrigerator.

BACKGROUND ART

A refrigerator is a household appliance that stores food at a low temperature, and the storage compartment is maintained at a constant low temperature.

A household refrigerator maintains a storage compartment at a temperature within upper and lower limit ranges on the basis of a set temperature. That is, the refrigerator is controlled by operating a freezing cycle to cool the storage compartment when the temperature of the storage compartment rises to the upper limit temperature, and stopping the freezing cycle when the temperature of the storage compartment reaches the lower limit temperature.

In recent years, a refrigerator in which a freezer compartment and a refrigerator compartment have evaporators, respectively, have been developed. Such a refrigerator allows refrigerant to flow to one of the evaporators of the freezing compartment and the refrigerating compartment, and then to the other evaporator.

Korean Patent registration No. 10-1576686 (registration date 2015.12.04), which is a prior document, discloses a method for controlling a refrigerator.

The method for controlling a refrigerator disclosed in the prior document includes cooling a refrigerating compartment by operating a refrigerating compartment valve and a freezing compartment fan, and then cooling the freezing compartment by operating the freezing compartment valve and the refrigerating compartment fan.

After cooling of the freezing compartment is completed, the compressor is stopped, and in this state, the freezing compartment fan is rotated to lower the temperature of the freezing compartment using the latent heat of evaporation.

However, in the case of the prior document, it is possible to lower the temperature of the freezing compartment while the compressor is stopped, but there is a problem in that the temperature of the refrigerating compartment cannot be lowered.

In general, the freshness of food stored in the refrigerating compartment is higher as the amount of change in the temperature of the refrigerating compartment decreases. When the freshness of the food is high, the storage period of the food may be increased.

However, in the case of the prior document, in order to cool the refrigerating compartment when the compressor is stopped, the temperature of the refrigerating compartment continuously rises until the compressor is operated again, and when the compressor is operated again, the temperature of the refrigerating compartment drops, resulting in a large temperature change. Therefore, there is a problem that the freshness of food stored in the refrigerating compartment is deteriorated.

DISCLOSURE

Technical Problem

The present disclosure provides a method for controlling a refrigerator capable of performing control such that a temperature change in a storage compartment is reduced to improve the freshness of an object to be stored.

The present disclosure provides a method for controlling a refrigerator capable of reducing power consumption caused in the case of turning on a compressor.

Technical Solution

According to an aspect of the present disclosure, a refrigerator may include a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, and a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment. A method of controlling the refrigerator may include operating a first cooling cycle for cooling the first storage compartment to operate the compressor and operating the first cold air supply device for the first storage compartment, and switching to a second cooling cycle to cool the second storage compartment to operate the compressor and operating the second cold air supply device when a stop condition of the first cooling cycle is satisfied.

According to the embodiment, a cooling power of the compressor in the current second cooling cycle is determined based on a representative temperature of the second storage compartment during one operation cycle including a previous first cooling cycle and a previous second cooling cycle, and a controller allows the compressor to operate in the current second cooling cycle with the determined cooling power.

The representative temperature may be an average temperature of the second storage compartment during the one operation cycle.

The representative temperature may be an average temperature between a maximum temperature and a minimum temperature of the second storage compartment during the one operation cycle.

The controller may allow the compressor to operate in the current second cooling cycle with a cooling power equal to the cooling power of the compressor in a previous second cooling cycle, when the representative temperature is within a temperature satisfaction range of the second storage compartment.

The temperature satisfaction range may include an upper limit temperature and a lower limit temperature, and a target temperature of the second storage compartment is a temperature within a range between the upper limit temperature and the lower limit temperature.

The controller may determine the cooling power of the compressor in the current second cooling cycle to be different from a cooling power of the compressor in the previous second cooling cycle, when the representative temperature is out of the temperature satisfaction range.

The controller may allow the compressor to operate in the current second cooling cycle with a cooling power which has increased from the cooling power of the compressor in the previous second cooling cycle, when the representative temperature is higher than the upper limit temperature of the temperature satisfaction range.

The controller may allow the compressor to operate in the current second cooling cycle with a cooling power which has decreased from the cooling power of the compressor in the previous second cooling cycle, when the representative temperature is lower than the lower limit temperature of the temperature satisfaction range.

The cooling power of the compressor in the first cooling cycle may be a fixed cooling power.

A case in which the stop condition of the first cooling cycle is satisfied includes one of a case in which a temperature of the first storage compartment is less than or equal to a reference temperature of the first storage compartment, a case in which the temperature of the first storage chamber reaches a target temperature and a set time has elapsed, and a case in which the temperature of the first storage compartment reaches a lower limit temperature of the temperature satisfaction range, the lower limit temperature being lower than the target temperature of the first storage compartment and higher than the reference temperature of the first storage compartment.

According to another aspect of the present disclosure, a refrigerator may include a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, and a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment. A method for controlling the refrigerator may include operating the compressor by operating a first cooling cycle for cooling the first storage compartment, and operating the first cold air supply device for the first storage compartment; and switching to a second cooling cycle for cooling the second storage compartment to operate the compressor and operating the second cold air supply device when a stop condition of the first cooling cycle is satisfied. An operation time of the current second cooling cycle is determined based on a representative temperature of the second storage compartment during one operating cycle including a previous first cooling cycle and a previous second cooling cycle, and a controller performs control such that the second cooling cycle is operated for the determined operation time.

The controller may perform control such that the current second cooling cycle is operated for an operation time equal to an operation time of a previous second cooling cycle when the representative temperature is within the temperature satisfaction range of the second storage compartment.

The controller may determine an operation time of the compressor in the current second cooling cycle to be different from an operation time of the compressor in the previous second cooling cycle, when the representative temperature is out of the temperature satisfaction range.

The controller may perform control such that the current second cooling cycle is operated for an operation time which has increased from an operation time of a previous second cooling cycle when the representative temperature is higher than the upper limit temperature of the temperature satisfaction range.

The controller may perform control such that the current second cooling cycle is operated for an operation time which has decreased from an operation time of a previous second cooling cycle when the representative temperature is lower than the lower limit temperature of the temperature satisfaction range.

The representative temperature may be an average temperature of the second storage compartment during the one operation cycle.

The representative temperature may be an average temperature between a maximum temperature and a minimum temperature of the second storage compartment during the one operation cycle.

The cooling power of the compressor in the first cooling cycle may be a fixed cooling power.

A case in which the stop condition of the first cooling cycle is satisfied includes one of a case in which a temperature of the first storage compartment is less than or equal to a reference temperature of a first refrigerating compartment, a case in which the temperature of the first storage chamber reaches a target temperature and a set time has elapsed, and a case in which the temperature of the first storage compartment reaches a lower limit temperature of the temperature satisfaction range, the lower limit temperature being lower than the target temperature of the first storage compartment and higher than the reference temperature of the first refrigerating compartment.

Advantageous Effects

According to the proposed present disclosure, the temperature of the first storage compartment can be kept constant within a temperature set range for the storage compartment. Since a cooling power of the compressor in the second cooling cycle for the second storage compartment is determined based on a representative temperature of the second storage compartment in a previous cycle, the width or amount of a temperature change in the second storage compartment can be reduced, thereby improving the freshness of an object to be stored.

In addition, since the compressor is continuously operated while a cooling power of the compressor is changed or maintained, compared to that in the previous cycle when the second cooling cycle is operated, it can be prevented to operate the compressor with excessive cooling power. Further since there is no need to turn off and then turn on the compressor, there is an advantage of reducing power consumption by start power required in the process of turning on the compressor.

MODE FOR INVENTION

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
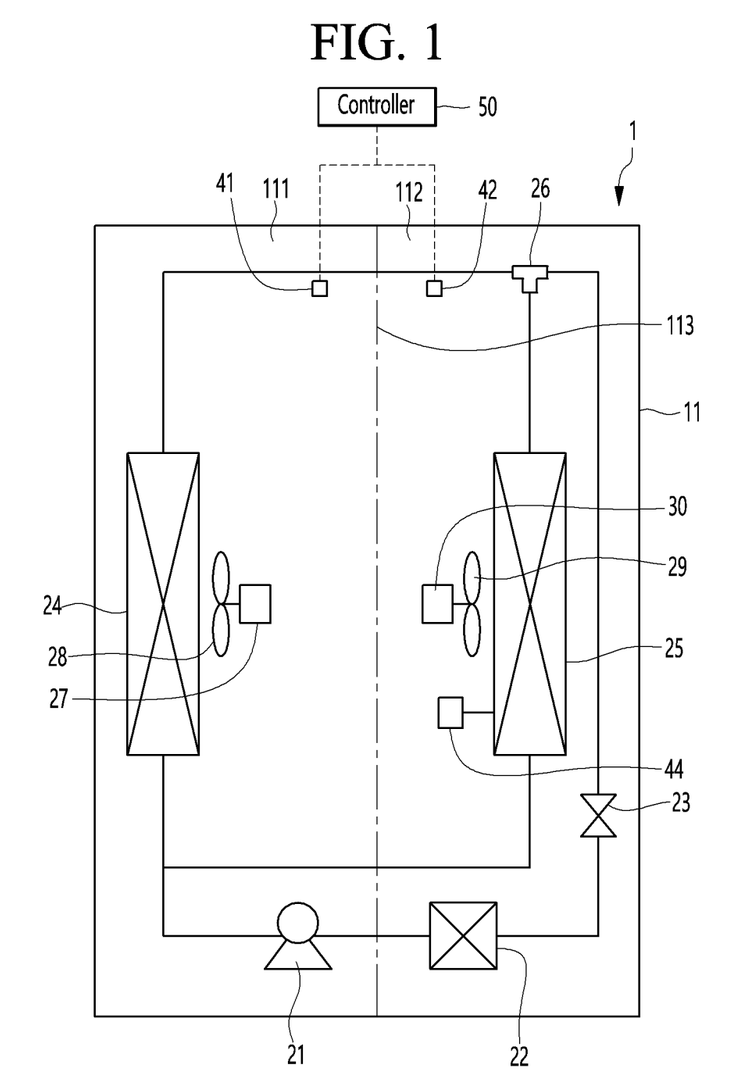
FIG. 1 is a view schematically showing a configuration of a refrigerator according to an embodiment of the present disclosure.
Figure 2:
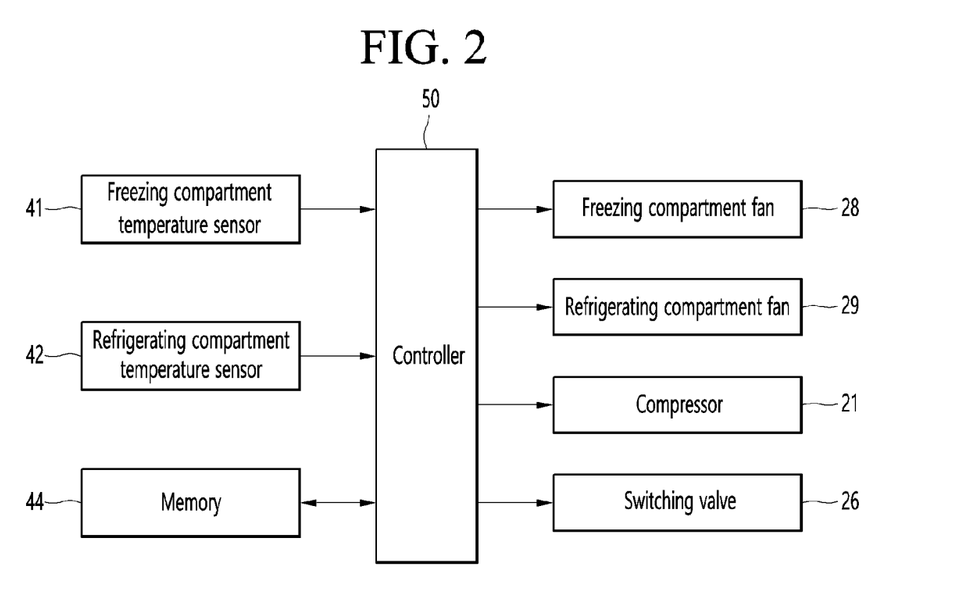
FIG. 2 is a block diagram of a refrigerator according to an embodiment of the present disclosure.

FIG. 1 is a view schematically showing a configuration of a refrigerator according to an embodiment of the present disclosure, and FIG. 2 is a block diagram of a refrigerator according to an embodiment of the present disclosure.

Referring to FIGS. 1 and 2, a refrigerator 1 according to an embodiment of the present disclosure may include a cabinet 10 having a freezing compartment 111 and a refrigerating compartment 112 formed therein and doors (not shown) coupled to the cabinet 10 to open and close the freezing compartment 111 and the refrigerating compartment 112, respectively.

The freezing compartment 111 and the refrigerating compartment 112 may be separated by a partition wall 113 in a left-right direction or vertically, or an up-down direction or horizontally in the interior of the cabinet 10.

The refrigerator 1 may further include a compressor 21, a condenser 22, an expansion member 23, a freezing compartment evaporator 24 (also referred to as a "first evaporator") to cool the freezing compartment 111, and a refrigerating compartment evaporator 25 (also referred to as a "second evaporator") to cool the refrigerating compartment 112.

The refrigerator 1 may include a switching valve 26 to allow refrigerant passing through the expansion member 23 to flow into any one of the freezing compartment evaporator 24 and the refrigerating compartment evaporator 26.

In the present disclosure, a state in which the switching valve 26 is operated such that the refrigerant flows into the freezing compartment evaporator 24 may be referred to as a first state of the switching valve 26. In addition, a state in which the switching valve 26 is operated to enable the refrigerant to flow into the refrigerating compartment evaporator 25 may be referred to as a second state of the switching valve 26. The switching valve 26 may be, for example, a three way valve.

The switching valve 26 may selectively open one of a first refrigerant passage connecting the compressor 21 and the refrigerating compartment evaporator 25 to enable the refrigerant to flow and a second refrigerant passage connecting the compressor 21 and the freezing compartment evaporator 24 to enable the refrigerant to flow. The cooling of the refrigerating compartment 112 and the cooling of the freezing compartment 111 may be alternately performed by the switching valve 26.

The refrigerator 1 may further include a freezing compartment fan 28 (also referred to as a "first blowing fan") to guide air to the freezing compartment evaporator 24, a first motor 27 to rotate the freezing compartment fan 28, a refrigerating compartment fan 29 (also referred to as a "second blowing fan") to guide air to the refrigerating compartment evaporator 25, and a second motor 30 to rotate the refrigerating compartment fan 29.

In the present disclosure, a series of cycles in which a refrigerant flows through the compressor 21, the condenser 22, the expansion member 23, and the freezing compartment evaporator 24 is referred to as a "freezing cycle", and a series of cycles in which a refrigerant flows through the compressor 21, the condenser 22, the expansion member 23 and the refrigerating compartment evaporator 25 is referred to as a "refrigerating cycle".

The phrase "a refrigerating cycle is operated" may mean that the compressor 21 is turned on, the refrigerating compartment fan 29 is rotated, and the refrigerant flows through the refrigerating compartment evaporator 25 by the switching valve 26 so that the refrigerant flowing through the refrigerating compartment evaporator 25 is heat exchanged with air.

In addition, the phrase "a freezing cycle is operated" means that the compressor 21 is turned on, the freezing compartment fan 28 is rotated, and the refrigerant flows through the freezing compartment evaporator 24 by the switching valve 26, so that the refrigerant flowing through the freezing compartment evaporator 24 is heat-exchanged with air.

Although it has been described that one expansion member 23 is located upstream of the switching valve 26 in the above description, alternatively, a first expansion member may be provided between the switching valve 26 and the freezing compartment evaporator 24 and a second expansion member may be provided between the switching valve 26 and the refrigerating compartment evaporator 25.

As another example, the switching valve 26 may not used, and a first valve may be provided on the inlet side of the freezing compartment evaporator 24, and a second valve may be provided on the inlet side of the refrigerating compartment evaporator 25. During the operation of the freezing cycle, the first valve may be turned on and the second valve may be turned off, and during the operation of the refrigerating cycle, the first valve may be turned off and the second valve may be turned on.

The refrigerator 1 may include a freezing compartment temperature sensor 41 to sense a temperature of the freezing compartment 111, a refrigerating compartment temperature sensor 42 to sense a temperature of the refrigerating compartment 112, an input interface (not shown) capable of enabling input of target temperatures (or set temperatures) of the freezing compartment 111 and the refrigerating compartments 112, and a controller 50 to control a cooling cycle (the freezing cycle or the refrigerating cycle) based on the input target temperatures and the temperatures detected by the temperature sensors 41 and 42.

In this specification, a temperature lower than the target temperature of the refrigerating compartment 112 may be referred to as a first refrigerating compartment reference temperature (or a first reference temperature), and a temperature higher than the target temperature of the refrigerating compartment 112 may be referred to as a second refrigerating compartment reference temperature (or a second reference temperature). In addition, a range between the first refrigerating compartment reference temperature and the second refrigerating compartment reference temperature may be referred to as a set temperature range of the refrigerating compartment.

Although not limited, the target temperature of the refrigerating compartment 112 may be an average temperature of the first refrigerating compartment reference temperature and the second refrigerating compartment reference temperature.

In this specification, a temperature lower than the target temperature of the freezing compartment 111 may be referred to as a first freezing compartment reference temperature (or a third reference temperature), and a temperature higher than the target temperature of the freezing compartment 111 may be referred to as a second freezing compartment reference temperature (or a fourth reference temperature). In addition, a range between the first freezing compartment reference temperature and the second freezing compartment reference temperature may be referred to as a set temperature range of the freezing compartment.

Although not limited, the target temperature of the freezing compartment 111 may be an average temperature of the first freezing compartment reference temperature and the second freezing compartment reference temperature.

In the present disclosure, the user may set the target temperatures of the freezing compartment 111 and the refrigerating compartment 112.

The controller 50 may control the temperature of the refrigerating compartment 112 to be maintained within a temperature satisfaction range that falls within the refrigerating compartment set temperature range. Alternatively, the controller 50 may control the temperature of the freezing compartment 111 to be maintained within a temperature satisfying range that falls within the freezing compartment set temperature range.

In this case, the upper limit temperature of the temperature satisfaction range may be set to be lower than the second refrigerating compartment reference temperature, and the lower limit temperature may be set to be higher than the first refrigerating compartment reference temperature.

In the present disclosure, the controller 50 may perform control such that a refrigerating cycle, a freezing cycle, and a pump down operation constitute one operation cycle. That is, the controller 50 may operate a relevant cycle while continuously operating the compressor 21 without stopping the compressor 21.

In the present embodiment, the pump down operation may refer to an operation of allowing the compressor to operate to collect the refrigerant remaining in the evaporators into the compressor in a state in which the supply of refrigerant to the plurality of evaporators is blocked.

The controller 50 may operate the refrigerating cycle, and when a stop condition of the refrigerating cycle (also referred to as a start condition of the freezing cycle) is satisfied, operate the freezing cycle. When the stop condition of the freezing cycle is satisfied while operating the freezing cycle, the pump down operation may be performed.

In this case, in the present disclosure, the start condition of the refrigerating cycle may be the same as the stop condition of the freezing cycle.

Alternatively, when the start condition of the refrigerating cycle and the stop condition of the freezing cycle are different from each other, satisfaction of the start condition of the refrigerating cycle may have priority over satisfaction of the stop condition of the freezing cycle.

That is, when the start condition of the refrigerating cycle is satisfied before the stop condition of the freezing cycle is satisfied, the freezing cycle may be stopped and the refrigerating cycle may be started after the pump down operation is performed.

In this embodiment, the pump down operation may be omitted under special conditions. In this case, the refrigerating cycle and the freezing cycle may be operated alternately. In this case, the refrigerating cycle and the freezing cycle may constitute one operation cycle.

For example, when the outside temperature of the refrigerator is low, the pump down operation may be omitted.

Meanwhile, the refrigerator 1 of the present disclosure may further include a memory 44 that stores representative temperatures of the freezing compartment 111 and the refrigerating compartment 112 during one cycle.

Hereinafter, a method for controlling a refrigerator according to the present disclosure will be described.

Figure 3:
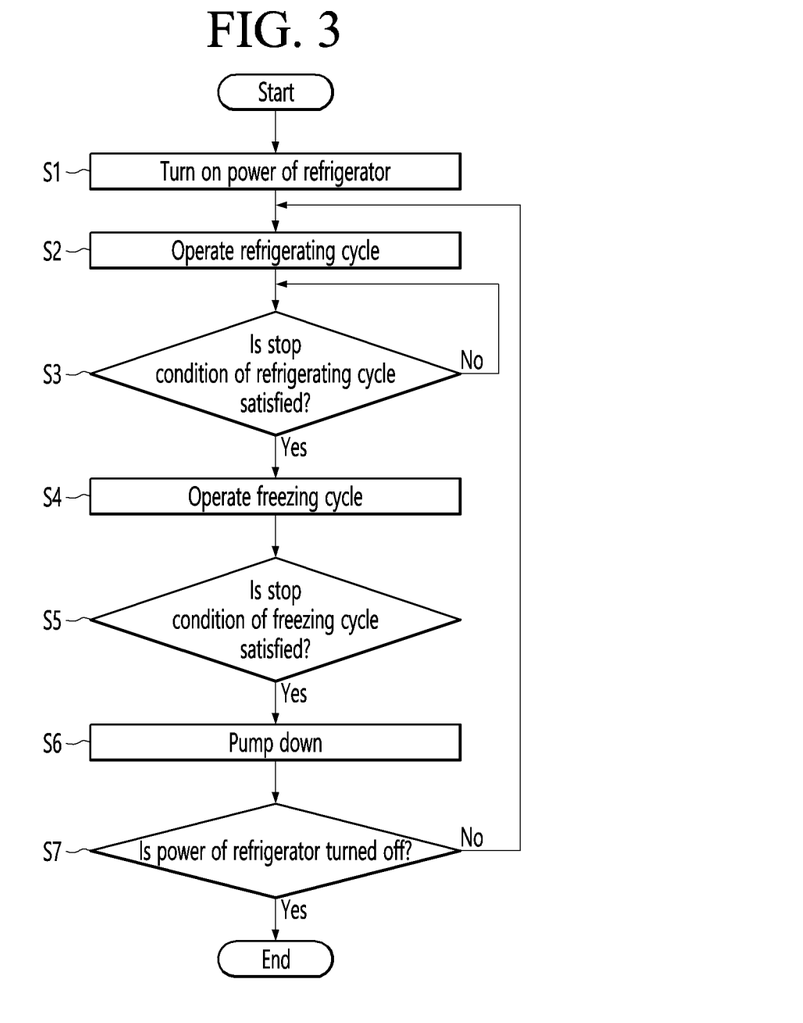
FIG. 3 is a flowchart for schematically describing a method of controlling a refrigerator according to an embodiment of the present disclosure.

FIG. 3 is a flowchart for schematically describing a method for controlling a refrigerator according to an embodiment of the present disclosure.

Referring to FIG. 3, the power of the refrigerator 1 is turned on (S1). When the power of the refrigerator 1 is turned on, the refrigerator 1 may be operated to cool the freezing compartment 111 or the refrigerating compartment 112.

Hereinafter, a method of controlling a refrigerator in the case of cooling the freezing compartment 111 after cooling the refrigerating compartment 112 will be described by way of example.

In order to cool the refrigerating compartment 112, the controller 50 may operate the refrigerating cycle (S2).

For example, the controller 50 may turn on the compressor 21 and rotate the refrigerating compartment fan 29. The controller 50 may switch the switching valve 26 to a first state such that a refrigerant flows to the refrigerating compartment evaporator 25.

The freezing compartment fan 28 may remain stationary when the refrigerating cycle is being operated.

Then, the refrigerant compressed by the compressor 21 and passed through the condenser 22 may flow to the refrigerating compartment evaporator 25 through the switching valve 26. The refrigerant evaporated while flowing through the refrigerating compartment evaporator 25 may flow back into the compressor 21.

Air which is heat exchanged with refrigerant in the refrigerating compartment evaporator 25 may be supplied to the refrigerating compartment 112. Therefore, the temperature of the refrigerating compartment 112 may decrease, while the temperature of the freezing compartment 111 may increase.

While the refrigerating cycle is operating in one cycle, the cooling power of the compressor 21 may be kept constant.

While the refrigerating cycle is being operated, the controller 50 may determine whether a stop condition of the refrigerating cycle is satisfied (S3). That is, the controller 50 may determine whether a start condition of the freezing cycle is satisfied.

For example, the controller 50 may determine that the stop condition of the refrigerating cycle is satisfied when the temperature of the refrigerating compartment 112 is less than or equal to a first refrigerating compartment reference temperature. Further, the controller 50 may determine that the start condition of the refrigerating cycle is satisfied when the temperature of the refrigerating compartment 112 is higher than or equal to a second refrigerating compartment reference temperature.

Alternatively, when a reference operation time has elapsed after the refrigerating cycle is operated, the controller 50 may determine that the stop condition of the refrigerating cycle is satisfied.

Alternatively, when a set time has elapsed after the temperature of the refrigerating compartment 112 has reached a target temperature, the controller 50 may determine that the stop condition of the refrigerating cycle is satisfied.

Alternatively, when the temperature of the refrigerating compartment 112 reaches a lower limit temperature of a temperature satisfaction range which is lower than the target temperature and higher than the first refrigerating compartment reference temperature, the controller 50 may determine that the stop condition of the refrigerating cycle is satisfied.

When it is determined in step S3 that the start condition of the freezing cycle is satisfied, the controller 50 may operate the freezing cycle (S4).

For example, the controller 50 may switch the switching valve 26 to a second state such that the refrigerant flows to the freezing compartment evaporator 24. However, even when switching from the refrigerating cycle to the freezing cycle is performed, the compressor 21 may be continuously operated without being stopped.

In addition, the controller 50 may rotate the freezing compartment fan 28 and stop the refrigerating compartment fan 29.

The cooling power of the compressor 21 in a case where the freezing cycle is operated may be determined based on a change in the temperature of the freezing chamber 111 in a previous cycle. A process of determining the cooling power of the compressor 21 will be described later.

When the refrigerator is powered on and the freezing cycle is first operated, the cooling power of the compressor 21 in a case where the freezing cycle is operated may be set as a reference cooling power.

The controller 50 may determine whether a stop condition of the freezing cycle is satisfied during the operation of the freezing cycle (S5).

For example, when the temperature of the refrigerating compartment 111 is higher than or equal to the second refrigerating compartment reference temperature, the freezing cycle may be stopped.

When the freezing cycle is stopped, the pump down operation may be performed (S6). The cooling power of the compressor 21 in the case of the pump down operation may be equal to the cooling power of the compressor 21 in a case where the freezing cycle is operated.

Unless the power of the refrigerator 1 is turned off (S7), the controller 50 may operate the refrigerating cycle again.

Figure 4:
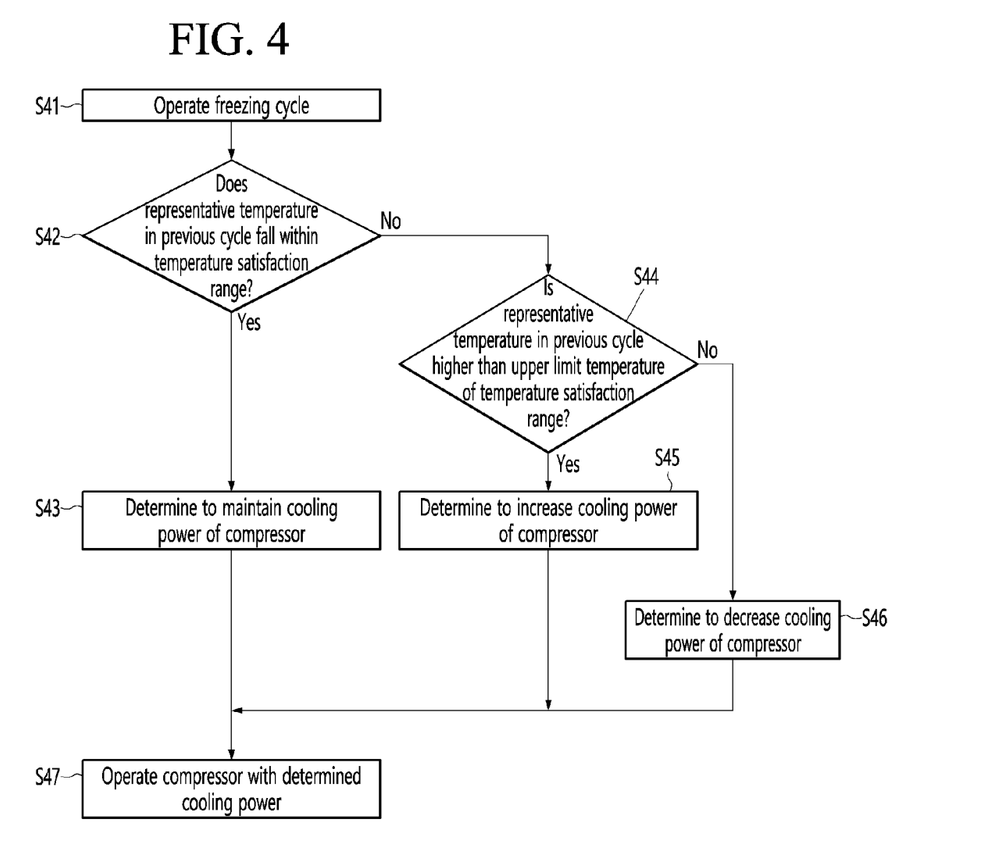
FIG. 4 is a flowchart for describing a method of determining a cooling power of a compressor when a freezing cycle is operated according to an embodiment of the present disclosure.
Figure 5:
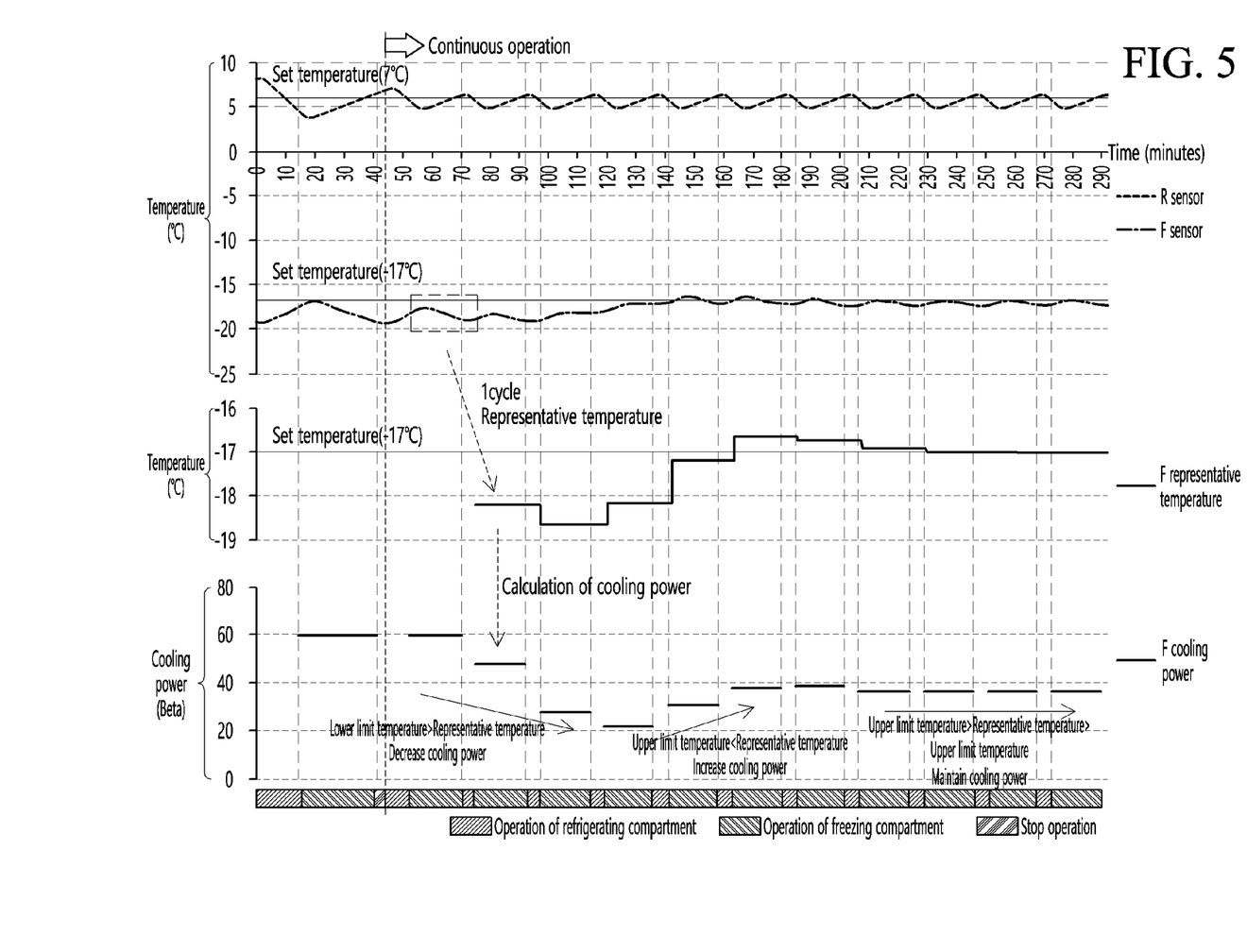
FIG. 5 is a graph showing a change in cooling power of a compressor during operation of a freezing cycle according to in a temperature change in a freezing compartment and a refrigerating compartment.

FIG. 4 is a flowchart for describing a method of determining a cooling power of a compressor when a freezing cycle is operated according to an embodiment of the present disclosure, and FIG. 5 is a graph showing a change in cooling power of a compressor during operation of a freezing cycle according to in a temperature change in a freezing compartment and a refrigerating compartment.

Referring to FIGS. 4 and 5, a cooling power of the compressor 21 in a case where the refrigerating cycle is stopped and the freezing cycle is operated may be determined based on a representative temperature of the freezing compartment 111 in a previous cycle.

For example, when the stop condition of the freezing cycle is satisfied, the refrigerating cycle is operated (S41).

The temperature of the freezing compartment 111 in the previous cycle may be periodically detected by the freezing compartment temperature sensor 41 and stored in the memory 44.

As described above, the temperature of the freezing compartment 111 in the previous cycle may include a temperature of the freezing compartment 111 in a case where the refrigerating cycle is operated, a temperature of the freezing compartment 111 in a case where the freezing cycle is operated, and a temperature of the freezing compartment 111 in a case where the pump down operation is performed.

Alternatively, the temperature of the freezing compartment 111 in the previous cycle may include a temperature of the freezing compartment 111 in a case where a previous refrigerating cycle is operated, a temperature of the freezing compartment 111 in the case where the pump down operation is performed, and a temperature of the freezing compartment 111 in the case where an immediately previous refrigerating cycle is operated.

In either case, the cooling power of the compressor 21 may be determined based on a change of temperature of the freezing compartment 111 before a current freezing cycle is started.

The controller 50 may determine a representative temperature among the temperatures of the freezing compartment 111 in the previous cycle, and determine whether the representative temperature falls within the temperature satisfaction range (S42).

In this case, the representative temperature may be, for example, an average temperature of the freezing compartment 111 in the previous cycle.

Alternatively, the representative temperature may be an average temperature of the highest temperature and the lowest temperature of the freezing compartment 111 in the previous cycle.

As a result of the determination in step S42, when the representative temperature of the freezing compartment 111 in the previous cycle falls within the temperature satisfaction range, the controller 50 may determine that the cooling power of the compressor 21 is maintained (S43).

That is, it is determined that the cooling power of the compressor 21 in the previous cycle is maintained in the current cycle.

As a result of determination in step S42, when the representative temperature of the freezing compartment 111 in the previous cycle is out of the temperature satisfaction range, the controller 50 may determine whether the representative temperature of the freezing compartment 111 is higher than the upper limit temperature of the temperature satisfaction range (S44).

As a result of the determination in step S44, when the representative temperature of the freezing compartment 111 is higher than the upper limit temperature of the temperature satisfaction range, the controller 50 may determine to increase the cooling power of the compressor 21 (S45).

In this case, an amount of increase in cooling power may be differently determined according to a magnitude of a difference between the representative temperature of the freezing compartment 111 and the upper limit temperature of the temperature satisfaction range.

For example, when the difference between the upper limit temperature of the temperature satisfaction range and the representative temperature is less than 0, and the absolute value of the difference between the upper limit temperature of the temperature satisfaction range and the representative temperature is less than or equal to a first reference value, the controller may determine to increase the cool power of the compressor 21 by a first level.

In addition, when the difference between the upper limit temperature of the temperature satisfaction range and the representative temperature is less than 0, and the absolute value of the difference between the upper limit temperature of the temperature satisfaction range and the representative temperature is greater than the first reference value, the controller may determine to increase the cooling power of the compressor 21 by a second level. In this case, the second level may be a value greater than the first level.

On the other hand, as a result of determination in step S44, a case in which the representative temperature of the freezing compartment 111 is not higher than the upper limit temperature of the temperature satisfaction range may be a case in which the representative temperature of the freezing compartment 111 is lower than the lower limit temperature of the temperature satisfaction range.

In this way, when the representative temperature of the freezing compartment 111 is lower than the lower limit temperature of the temperature satisfaction range, the controller 50 may determine to decrease the cooling power of the compressor 21 (S46).

In this case, an amount of decrease in cooling power may be differently determined according to a magnitude of a difference between the representative temperature of the freezing compartment 111 and the lower limit temperature of the temperature satisfaction range.

For example, when the difference between the lower limit temperature of the temperature satisfaction range and the representative temperature is greater than 0, and the absolute value of the difference between the lower limit temperature of the temperature satisfaction range and the representative temperature is less than or equal to a first reference value, it may be determined to decrease the cooling power of the compressor 21 by a first level.

In addition, when the difference between the lower limit temperature of the temperature satisfaction range and the representative temperature is greater than 0, and the absolute value of the difference between the lower limit temperature of the temperature satisfaction range and the representative temperature is greater than the first reference value, it may be determined to decrease the cooling power of the compressor 21 by a second level.

The controller 50 may operate the compressor 21 with the determined cooling power.

As in the present disclosure, since whether the start condition and the stop condition of the refrigerating cycle are satisfied is determined based on the reference temperature of the first refrigerating compartment and the reference temperature of the second refrigerating compartment, it is possible to simplify a control method for determining whether the stop condition and the start condition of the refrigerating cycle are satisfied.

In addition, there is an advantage in that the temperature of the refrigerating compartment can be kept between the reference temperature of the first refrigerating compartment and the reference temperature of the second refrigerating compartment.

For example, referring to FIG. 5, since the cooling power of the compressor 21 is changed using the temperature information of the previous cycle during a next cycle after one cycle has been operated, a deviation of the temperature of the freezing compartment 111 and a target temperature (a temperature within the temperature satisfaction range) may decrease as the number of cycles increases.

As the number of cycles increases, the temperature of freezing compartment 111 converges to the target temperature, so that a change in temperature of an object stored in the freezing compartment 111 may be minimized.

In addition, since the cooling power of the compressor 21 is determined based on the representative temperature of the freezing compartment 111 of the previous cycle when the freezing cycle is operated, a change width or amount in the temperature of the freezing compartment 111 is reduced and the temperature of the freezing compartment 111 is maintained at a temperature that belongs to the temperature satisfaction range or is as close as possible to the temperature satisfaction range.

As described above, when the cooling power of the compressor 21 is changed or maintained compared to the previous cycle during the operation of the freezing cycle, the compressor 21 is prevented from be operated with excessive cooling power even when the compressor 21 is continuously operated. In addition, there is an advantage of reducing power consumption caused by start power required in the process of turning the compressor 21 off and then on.

In FIGS. 1 to 5, the description has been given by taking as an example, a case in which the cooling power of the compressor is fixed in the case of the refrigerating cycle, and the cooling power of the compressor is changed in the case of the freezing cycle, but the opposite case is also possible.

That is, in the case of the freezing cycle, the cooling power of the compressor 21 is fixed, and whether a start condition and a stop condition of the freezing cycle are satisfied may be determined based on the first and second freezing compartment reference temperatures. When the refrigerating cycle is operated, the cooling power of the compressor 21 may be changed or maintained based on the representative temperature of the refrigerating compartment 21 in the previous cycle.

Figure 6:
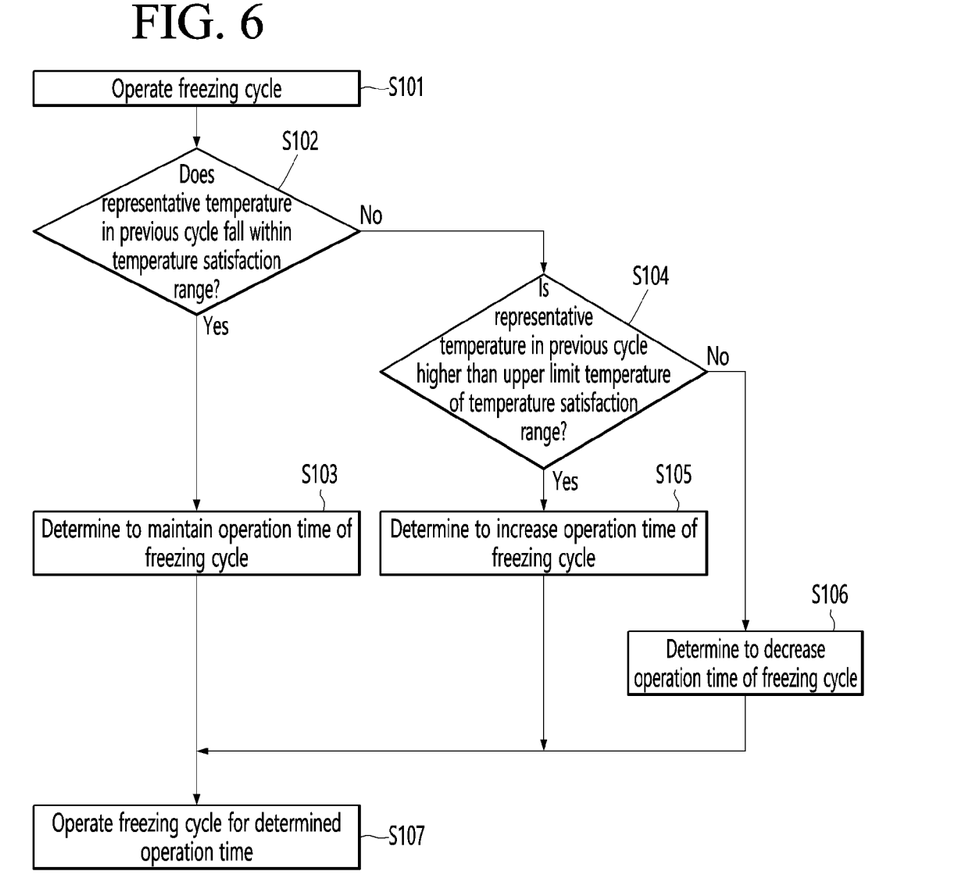
FIG. 6 is a flowchart for describing a method of determining an operation time of a freezing cycle when a freezing cycle is operated according to another embodiment of the present disclosure.

FIG. 6 is a flowchart for describing a method of determining an operation time of a freezing cycle when a freezing cycle is operated according to another embodiment of the present disclosure.

Referring to FIG. 6, the present embodiment is substantially identical to the embodiments described with reference to FIGS. 1 to 5, except that the operation time of the freezing cycle is changed based on the representative temperature of the freezing compartment in the previous cycle in a state in which the cooling power of the compressor is maintained, without change of the cooling power of the compressor. Therefore, hereinafter, only characteristic parts of the present embodiment will be described.

For example, when the stop condition of the freezing cycle is satisfied, the refrigerating cycle is operated (S101).

The controller 50 may determine a representative temperature among the temperatures of the freezing compartment 111 in the previous cycle, and determine whether the representative temperature falls within the temperature satisfaction range (S102).

In this case, the representative temperature may be, for example, an average temperature of the freezing compartment 111 in the previous cycle.

Alternatively, the representative temperature may be an average temperature of the highest temperature and the lowest temperature of the freezing compartment 111 in the previous cycle.

As a result of the determination in step S102, when the representative temperature of the freezing compartment 111 in the previous cycle falls within the temperature satisfaction range, the controller 50 may determine to maintain the operation time of the freezing cycle (S103).

That is, the freezing cycle may be operated for the operation time equal to the operation time of the freezing cycle in the previous cycle.

The reason for this is to ensure that the representative temperature of the freezing compartment 111 is continuously maintained within the temperature satisfaction range by maintaining the operation time of the freezing cycle, since the representative temperature of the freezing compartment 111 falls within the temperature satisfaction range.

As a result of determination in step S102, when the representative temperature of the freezing compartment 111 in the previous cycle is out of the temperature satisfaction range, the controller 50 may determine whether the representative temperature of the freezing compartment 111 is higher than the upper limit temperature of the temperature satisfaction range (S104).

As a result of the determination in step S104, when the representative temperature of the freezing compartment 111 is higher than the upper limit temperature of the temperature satisfaction range, the controller 50 may determine to increase the operation time of the freezing cycle (S105).

In this case, an amount of increase in the operation time may be differently determined according to a magnitude of a difference between the representative temperature of the freezing compartment 111 and the upper limit temperature of the temperature satisfaction range.

For example, when the difference between the upper limit temperature of the temperature satisfaction range and the representative temperature is less than 0, and the absolute value of the difference between the upper limit temperature of the temperature satisfaction range and the representative temperature is less than or equal to a first reference value, the controller may determine to increase the operation time by a first time.

In addition, when the difference between the upper limit temperature of the temperature satisfaction range and the representative temperature is less than 0, and the absolute value of the difference between the upper limit temperature of the temperature satisfaction range and the representative temperature is greater than the first reference value, the controller may determine to increase the operation time by a second time larger than the first time.

On the other hand, as a result of determination in step S104, a case in which the representative temperature of the freezing compartment 111 is not higher than the upper limit temperature of the temperature satisfaction range may be a case in which the representative temperature of the freezing compartment 111 is lower than the lower limit temperature of the temperature satisfaction range.

In this way, when the representative temperature of the freezing compartment 111 is lower than the lower limit temperature of the temperature satisfaction range, the controller 50 may determine to decrease the operation time (S46).

In this case, an amount of decrease in the operation time may be differently determined according to a magnitude of a difference between the representative temperature of the freezing compartment 111 and the lower limit temperature of the temperature satisfaction range.

For example, when the difference between the lower limit temperature of the temperature satisfaction range and the representative temperature is greater than 0, and the absolute value of the difference between the lower limit temperature of the temperature satisfaction range and the representative temperature is less than or equal to a first reference value, the controller may determine to decrease the operation time by a third time.

In addition, when the difference between the lower limit temperature of the temperature satisfaction range and the representative temperature is greater than 0, and the absolute value of the difference between the lower limit temperature of the temperature satisfaction range and the representative temperature is greater than the first reference value, the controller may determine to decrease the operation time by a fourth time larger than the third time.

The controller 50 may operate the freezing cycle for the determined operation time.

In this case, when the start condition of the refrigerating cycle is satisfied before the freezing cycle is operated for the determined operation time, the controller 50 may allow the pump down operation to be performed.

In FIG. 6, it has been described as an example that the operating time of the freezing cycle is changed, but the opposite case is also possible.

That is, in the case of the freezing cycle, whether a start condition and a stop condition of the freezing cycle are satisfied may be determined based on the first and second freezing compartment reference temperatures. When the refrigerating cycle is operated, the operation time of the refrigerating cycle may be changed or maintained based on the representative temperature of the refrigerating compartment in the previous cycle.

In the present specification, the refrigerating compartment may be referred to as a first storage compartment, and the freezing compartment may be referred to as a second storage compartment. The refrigerating cycle may be referred to as a first cooling cycle for the first storage compartment, and the freezing cycle may be referred to as a second cooling cycle for the second storage compartment. The refrigerating compartment fan may be referred to as a first cool air supply device for the first storage compartment, and the freezing compartment fan may be referred to as a second cool air supply device for the second storage compartment.

Alternatively, on the contrary, the refrigerating compartment may be referred to as a second storage compartment, and the freezing compartment may be referred to as a first storage compartment. The refrigerating cycle may be referred to as a second cooling cycle for the second storage compartment, and the freezing cycle may be referred to as a first cooling cycle for the first storage compartment. The refrigerating compartment fan may be referred to as a second cool air supply device for the second storage compartment, and the freezing compartment fan may be referred to as a first cool air supply device for the first storage compartment.

What is claimed is:

1. A method for controlling a refrigerator, comprising:
operating a current first cooling cycle to cool a first storage compartment;
switching to a current second cooling cycle to cool a second storage compartment when a stop condition of the first cooling cycle is satisfied; and
determining an operation time of the current second cooling cycle based on a representative temperature of the second storage compartment during a previous operating cycle, which includes a previous first cooling cycle and a previous second cooling cycle.

2. The method of claim 1, wherein the operation time is determined to be equal to a previous operation time of a previous second cooling cycle when the representative temperature is within a temperature satisfaction range of the second storage compartment.

3. The method of claim 2, wherein the operation time is determined to be different from the previous operation time when the representative temperature is outside of the temperature satisfaction range.

4. The method of claim 3, wherein the operation time is determined to be greater than the previous operation time when the representative temperature is higher than an upper limit temperature of the temperature satisfaction range.

5. The method of claim 3, wherein the operation time is determined to be less than the previous operation time when the representative temperature is lower than a lower limit temperature of the temperature satisfaction range.

* * * * *